Oct. 23, 1928. 1,688,330
F. W. GUNTHER ET AL
APPARATUS FOR MEASURING THE SHRINKAGE OF MATERIALS
Filed Aug. 15, 1925   2 Sheets-Sheet 2
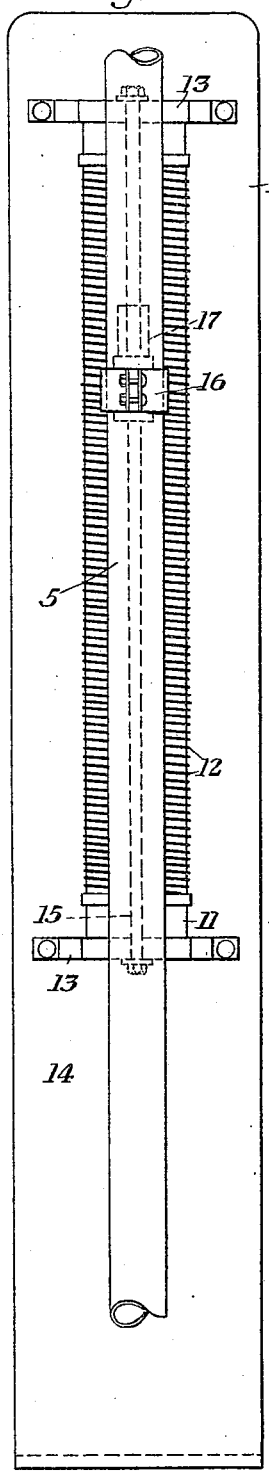
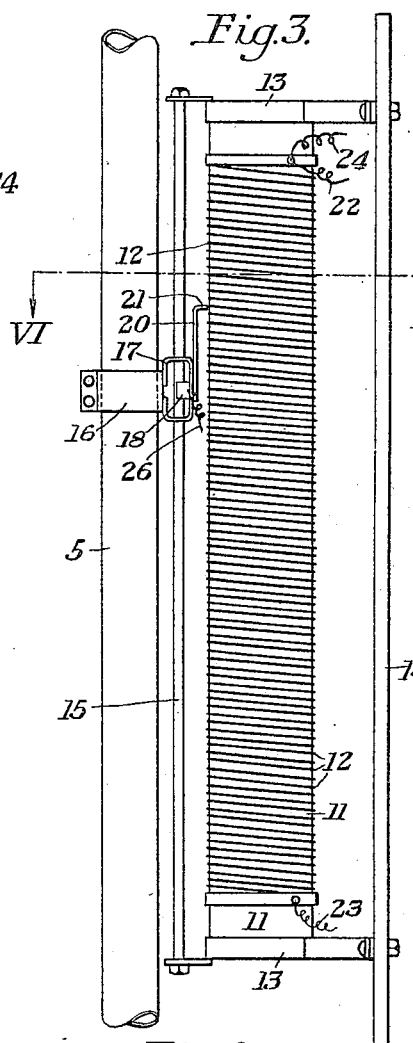
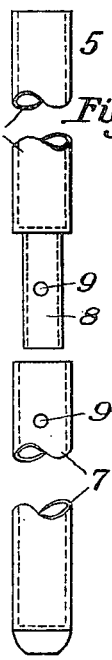
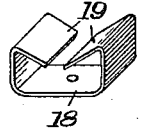
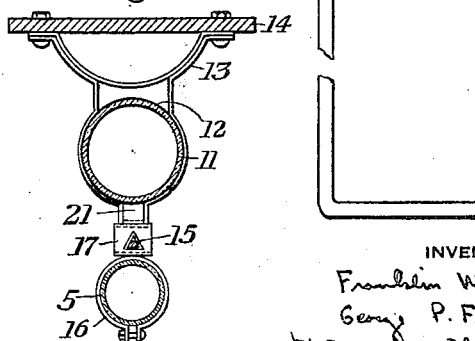
INVENTOR
Franklin W. Gunther
George P. Fisher
by Byrnes, Stebbins & Parmelee
their attys.

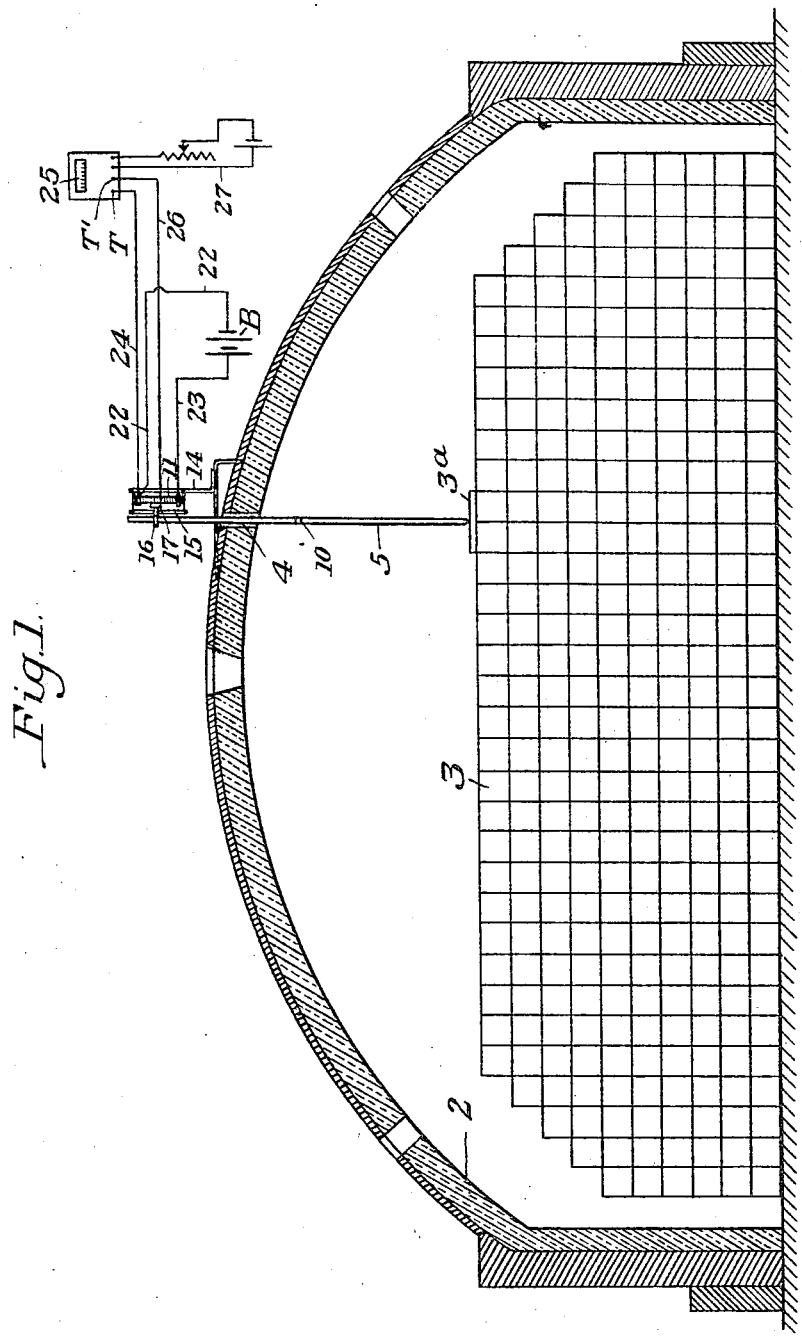

Patented Oct. 23, 1928.

1,688,330

UNITED STATES PATENT OFFICE.

FRANKLIN W. GUNTHER AND GEORGE P. FISHER, OF OTTAWA, ILLINOIS, ASSIGNORS TO NATIONAL FIRE PROOFING COMPANY, OF PITTSBURGH, PENNSYLVANIA, A CORPORATION OF PENNSYLVANIA.

APPARATUS FOR MEASURING THE SHRINKAGE OF MATERIALS.

Application filed August 15, 1925. Serial No. 50,402.

The present invention relates broadly to measuring devices, and more particularly to apparatus adapted to indicate or measure the shrinkage of materials, such as blocks, bricks or other refractory or cementitious compositions or shapes.

The shrinkage of materials during drying or kiln burning bears a direct ratio to certain characteristics of the finished materials, such as moisture content, porosity and the like; and it is therefore advantageous to provide means for determining the amount of such shrinkage. In this manner, it is possible to obtain at a given instant a comprehensive survey of conditions existing within the drying chamber or kiln, and likewise obtain desirable knowledge with respect to the characteristics of the material undergoing treatment.

In the accompanying drawings, there is shown for purposes of illustration only one form of the invention as applicable for use in connection with kilns or drying chambers, it being understood that the drawings do not define the limits of our invention, as changes in the construction and operation disclosed therein may be made without departing from the spirit of the invention or the scope of the broader claims.

In the drawings:

Figure 1 is a vertical transverse sectional view partly diagrammatic and illustrating one embodiment of the invention;

Figure 2 is a detail front elevational view illustrating a portion of the measuring or indicating mechanism;

Figure 3 is a side view of the construction shown in Figure 2;

Figure 4 is a side elevational view partly broken away and illustrating adjacent parts in spaced relation to enable an understanding of the construction thereof;

Figure 5 is a perspective view of the contact spring mounting; and

Figure 6 is a transverse sectional view on the line VI—VI of Figure 3, looking in the direction of the arrows.

In the accompanying drawings, there is illustrated somewhat diagrammatically a kiln or drying chamber 2 of any desired construction, the utility of the invention not being limited with respect to the construction or operating characteristics of the kiln or chamber. Hereinafter the word "chamber" will be used in its generic sense as definitive of kilns, drying chambers, tunnel kilns or other forms of apparatus or equipment adaptable for use in accordance with the present invention.

Within the chamber there is shown a plurality of bricks or blocks 3 undergoing treatment.

It will be understood that in accordance with present day practice, materials of the character herein contemplated are usually placed within a chamber in green state and then dried for a predetermined length of time under predetermined temperature conditions. We have found that the shrinkage which takes place in such materials bears a direct relationship to certain characteristics thereof, whereby it is possible by the act of determining or measuring the shrinkage to ascertain desirable information relative to such characteristics. From a practical standpoint, it is, of course, not expedient for an operator at all times to enter a chamber and manually determine the shrinkage which has taken place. In order to provide practical operative means for this purpose, we have indicated the roof of the chamber as having a bushing 4 through which extends a material-engaging rod 5 which may conveniently be in the form of sections, whereby the length thereof may be varied at will.

In Figure 4 of the drawings, there is illustrated an upper section 6 and a lower section 7, the upper section having a reduced portion 8 adapted to telescope within the upper end of the lower section, the sections being provided with cooperating openings 9, through which a pin 10 may be passed for securing the parts together. The lower end of the material-engaging rod is adapted to cooperate directly with the material or with a pressure block 3ª placed thereon. The construction of the bushing 4 and the weight of the rod 5 are such as to insure vertical raising or lowering of the rod in accordance with changes in the dimensions of the material undergoing treatment. It will be readily apparent to those skilled in the art that it is not necessary to measure the individual shrinkage of each of the shapes undergoing treatment, it being just as expedient to determine the number of shapes in superimposed relation and then measure or indicate the total shrinkage in a vertical direction of all of such shapes. This total may, in turn, be divided, as readily apparent, and the individual shrinkage accurately obtained. Inasmuch as a chamber is usually filled at one time with a plurality of shapes formed from a substantially common mix or batch, it will be understood that an operation of the character referred to gives such a desirable result.

In actual operation, advantage is taken of the movement of the rod 5 for directly indicating in inches and subdivisions of an inch the shrinkage which takes place. As a matter of operating expediency, it is impracticable to directly check readings from the position of the rod 5, and in view of this difficulty, use is made of an intermediate indicating mechanism operated preferably by an electric circuit.

In the preferred embodiment of the invention, this intermediate indicating mechanism comprises a tube 11 of suitable insulating material having wrapped therearound or mounted thereon in any desired manner a predetermined length of resistance material 12 having a known resistance per unit of length. The tube 11 may be mounted by mounting brackets 13, located adjacent the opposite ends thereof and cooperating with a suitable standard 14, extending upwardly from the roof of the chamber. Preferably secured to the clamps 13 is a slide rod 15, which may conveniently be of triangular cross section, as clearly indicated in Figure 6.

Secured at a predetermined point on the upper end of the rod 5 is a slide clamp 16, carrying a slide 17, preferably having openings of generally triangular configuration, as shown in Figure 6, for cooperation with the slide rod 15. Within the slide 17 is mounted a contact finger support 18 having angularly disposed contact portions 19, adapted to engage opposite sides of the slide rod 15 during movement of the slide and maintain such relationship therewith as to insure a current flow between the support and the slide rod. Secured to the support is a contact finger 20, having an angularly extending contact portion 21, adapted to directly engage the resistance material 12.

The opposite ends of the resistance material, herein shown as comprising a length of wire, have a connection 22 to one side of a source of electrical current B and another connection 23 to the opposite side of said source. One end of the wire also has a connection 24 to one terminal T of an indicating device, such as an indicating voltmeter, preferably carrying an indicating scale 25 graduated to read directly in inches and fractions of an inch. The terminal T' of the voltmeter has a connection 26 with the slide 17. By reason of this construction, it will be apparent that as the rod 5 moves downwardly, the slide 17 will be moved in such direction as to cut in gradually increasing amounts of resistance. Inasmuch as current from the source B will flow through circuits in inverse ratio to the resistance in such circuits, it will be obvious that each change in the resistance in the voltmeter circuit will effect a variation in the reading thereof. This reading when made directly in fractions of an inch will give an accurate indication of the shrinkage of the material undergoing treatment.

It is obvious that it is desirable to provide means for insuring an accurate zero position of the voltmeter needle, and for this purpose, the voltmeter may have an external resistance circuit 27 effective in known manner for obtaining zero adjustment.

The advantages of the present invention arise from the combination of a chamber and means for indicating the shrinkage of material undergoing treatment therein.

Further advantages of the invention arise from the provision of indicating means making it possible to determine certain characteristics of the material being treated by reason of the shrinkage therein.

Still other advantages arise from the method of indicating shrinkage directly in units of length, such as inches, by means of a resistance circuit.

We claim:

1. The combination with a material-drying chamber, of a rod projecting into said chamber and movable in accordance with variations in the dimensions of the material therein, and indicating means cooperating with said rod and enabling the determination of the amount of movement thereof, said indicating means including a resistance circuit and means for varying the resistance therein, substantially as described.

2. The combination with a material-drying chamber, and an indicating device mounted on a surface thereof, of a rod projecting into said chamber and movable in accordance with variations in a dimension of material therein, the rod cooperating with the indicating device for enabling the determination of the amount of movement thereof.

3. The combination with a material-drying chamber, and an indicating device mounted on an external surface thereof, of a rod projecting into said chamber and movable in accordance with variations in a dimension of material therein, the rod cooperating with the indicating device for enabling the determination of the amount of movement thereof.

4. The combination with a material drying chamber, of a rod projecting into said chamber and movable in accordance with variations in the dimensions of the material therein, an electrical circuit controlling device actuated by the rod, and indicating means comprising a stationary electrical device cooperating with the circuit controlling device for indicating the condition of material in the material drying chamber.

5. The combination with a material drying chamber, of a rod projecting into said chamber and movable in accordance with variations in the dimensions of the material therein, an electrical contact member actuated by the rod, and indicating means comprising a stationary electrical contacting device cooperating with the contact member for indicating changes in the dimensions of the material in the chamber.

In testimony whereof we have hereunto set our hands.

FRANKLIN W. GUNTHER.
GEORGE P. FISHER.